United States Patent [19]
Blanchet et al.

[11] 3,948,193
[45] Apr. 6, 1976

[54] VAULT FOR FURNACES

[75] Inventors: Pierre Blanchet, Juvisy-sur-Orge; Guy Gasparini, Vedene; Serge Dodard, Jonquerettes, all of France

[73] Assignee: Societe Europeenne des Produits Refractaires, France

[22] Filed: Mar. 6, 1974

[21] Appl. No.: 448,711

Related U.S. Application Data

[63] Continuation-in-part of Ser. No. 273,963, July 21, 1972, abandoned.

[30] Foreign Application Priority Data

July 27, 1971   France .............................. 71.27454

[52] U.S. Cl. ................................. 110/99 R; 52/89
[51] Int. Cl.² ........................ E04B 7/08; F23M 5/02
[58] Field of Search ...................... 52/87–89, 232, 52/324, 437, 439, 440, 496, 599, 612, 86; 110/99 A, 99 R

[56] References Cited
UNITED STATES PATENTS

| | | | |
|---|---|---|---|
| 51,328 | 12/1865 | Lockwood | 52/86 |
| 468,871 | 2/1892 | Guastavino | 52/89 |
| 1,267,747 | 5/1918 | Comerma | 52/89 |
| 2,269,445 | 1/1942 | Easter | 52/232 |
| 2,277,507 | 3/1942 | Benner | 52/439 |
| 3,164,928 | 1/1965 | Sarros | 52/88 |
| 3,669,701 | 6/1972 | Biederman | 166/292 |

FOREIGN PATENTS OR APPLICATIONS

| | | | |
|---|---|---|---|
| 538,089 | 3/1922 | France | 52/382 |
| 1,040,164 | 5/1953 | France | 52/464 |
| 1,152,718 | 8/1963 | Germany | 110/99 A |
| 982,938 | 2/1951 | France | 52/89 |
| 460,763 | 6/1928 | Germany | 110/99 A |
| 402,858 | 12/1933 | United Kingdom | 52/88 |

*Primary Examiner*—Alfred C. Perham
*Attorney, Agent, or Firm*—Watson, Cole, Grindle & Watson

[57] ABSTRACT

A novel vault for industrial furnaces, such as glass-making and metallurgical furnaces, comprised of a plurality of arches arranged side-by-side and each composed of a plurality of archstones made of fused cast refractory material. The archstones include a relatively thin slab-like lower portion and at least one upper rib integral therewith extending along the longitudinal direction of the individual arches. The corresponding ribs of the archstones of a given arch are aligned and define recessed portions filled with a refractory concrete having preferably good thermally insulating properties. A highly efficient thermally insulating structure covers the filled archstones.

9 Claims, 3 Drawing Figures

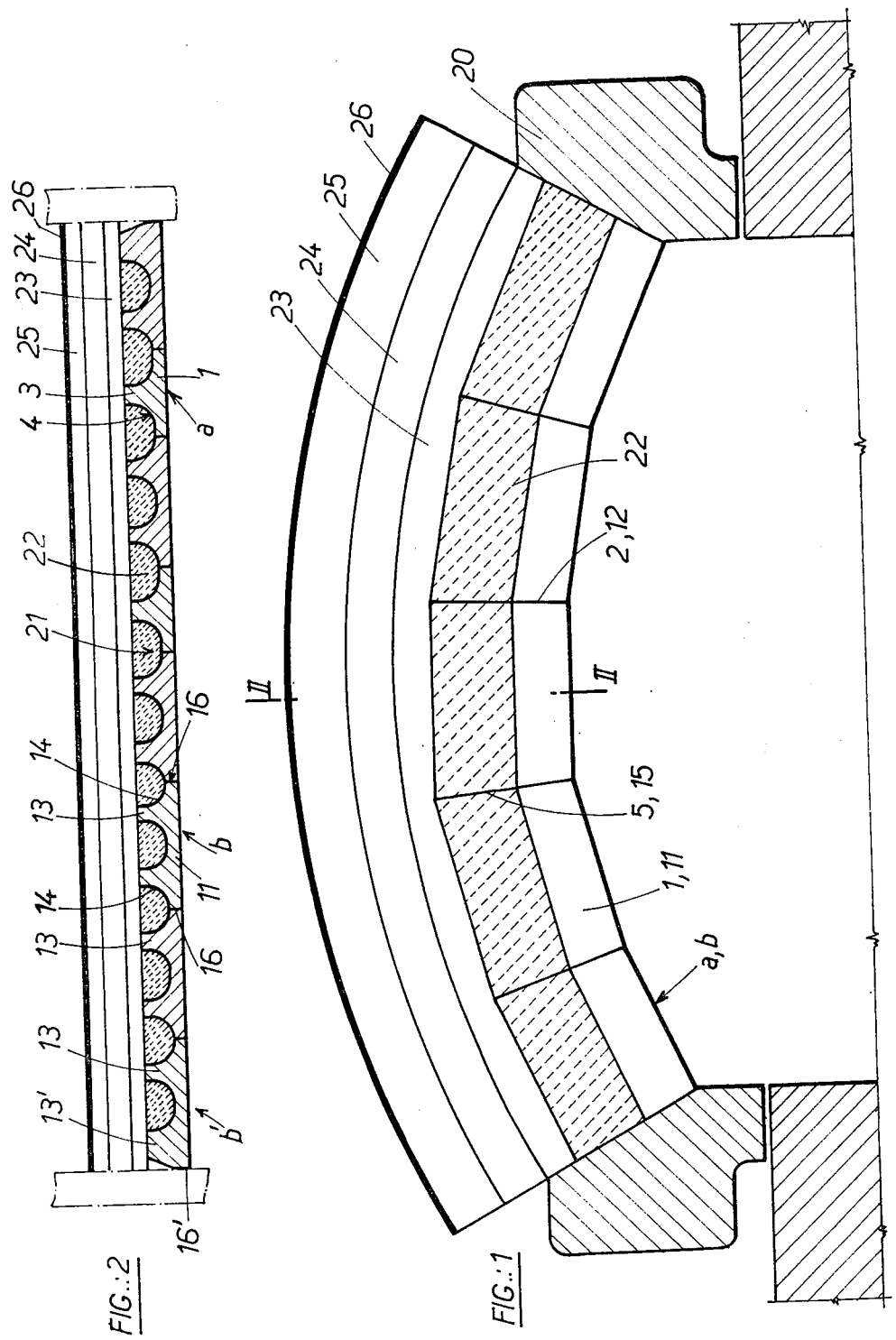

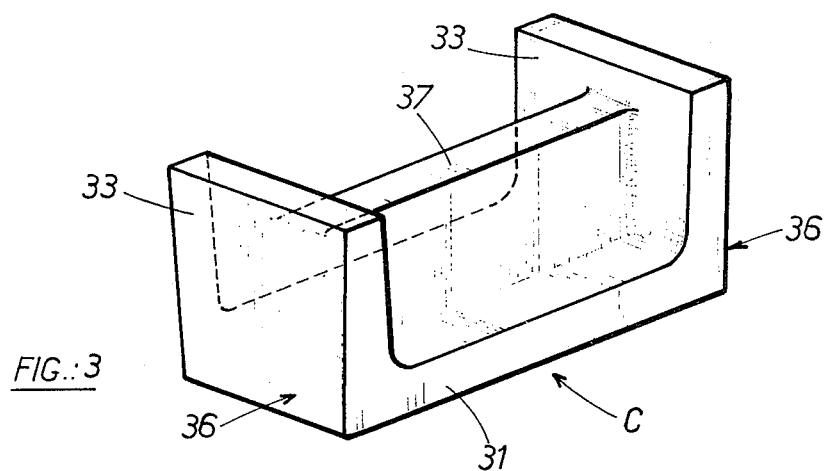
FIG.: 3

VAULT FOR FURNACES

RELATED APPLICATION

This is a continuation-in-part to U.S. Pat. application Ser. No. 273,963 filed July 21, 1972, now abandoned.

BACKGROUND OF THE INVENTION

The invention relates to a novel vault for industrial furnaces, such as glass and metallurgical furnaces.

Numerous industrial furnaces, such as those used in glass-making and metallurgy, have vaults or crowns comprised of a plurality of arches made of archstones or keys, the extreme archstones of which abut on skew blocks which rest generally on the side walls of the furnace through the intermediary of expansion joints. The archstones of the vault are subjected to very heavy thermal radiation and must be sufficiently refractory to withstand the temperature to which they are raised as well as the action, at this temperature, of the corrosive agents present in the atmosphere of the furnace.

The vaults, which are usually used at the present time in glass furnaces, are comprised of archstones of agglomerated silica of relatively large thickness with a thermal insulation above the archstones. Only a limited thermal insulation is possible when using such archstones because the mechanical strength of agglomerated silica decreases very rapidly at high temperature. Consequently, one is obliged to accept an important loss of heat from the vault towards the exterior and to use archstones of relatively large thickness, so that the temperature of the archstones in the zone next to their top face remains compatible with the retention of a sufficient mechanical strength. Assuming that the temperature of the bottom face of the vault is of the order of 1500°C, the thermal insulation is adjusted so that the temperature of the top face of the vault does not exceed 1100°C. Obviously, the economy of furnaces provided with such vaults is poor due to the important loss of heat. Further, the corrosion resistance of agglomerated silica is also poor so that it is necessary to change the archstones of the vault after a relatively short period of service, for instance every one or two years, which make it necessary to stop the operation of the furnace.

It has been also suggested in U.S. Pat. No. 2,277,507 to construct suspended arches in furnaces by using fused cast refractory blocks having a large central cavity filled with granules of heat-insulating material united to one another and to the walls of the cavity. However, the construction of suspended arches implies the use of suspending elements, usually in metal, the mechanical strength of which is poor at elevated temperatures so that it is not possible, with such a construction, to have a highly efficient thermally insulating structure above the disclosed blocks so that the economy of the furnaces equipped with vaults made of such suspended arches would remain poor. Further, the manufacture of the disclosed blocks is poorly feasible at an industrial scale and, to the knowledge of the applicants, such suspended arches have not received industrial success.

SUMMARY OF THE INVENTION

The object of the invention is to provide a novel vault for industrial furnaces having a long service life and which highly reduce the loss of heat of the furnace so that the economy of the furance is highly improved.

According to the invention, there is provided a vault having a plurality of arches arranged side-by-side. Each arch is made of a plurality of archstones composed of a fused cast refractory material. Each archstone has a lower portion of a thickness ranging from about 90 to about 130 mm, preferably from about 100 to about 120 mm, and at least one upper rib portion integral with the lower portion and having a height ranging from about 130 to about 270 mm. The upper upper rib portion extends along the longitudinal direction of the arch wherein it is incorporated. The corresponding upper rib portions of the archstones of a given arch are in alignment and abutment relationships. A refractory concrete fills the recessed portions existing between the aligned upper rib portions. A thermally insulating structure covers the filled ribbed archstones. The insulating structure is such that the temperature at the top face thereof does not exceed about 120°C and preferably does not exceed 100°C.

As suitable fused cast material, we may mention refractory oxides such as alumina, zirconia, magnesia, chromium oxide, mixtures thereof and with silica. The choice of a particular refractory material is dependent upon the nature and the particular aggressiveness of the gases or fumes coming in contact with the bottom face of the vault in the furnace. Some examples will be given below.

As stated, each archstone has a lower portion of a thickness ranging from about 90 to about 130 mm, preferably from about 100 to about 120 mm. It has been found that such a thickness range is sufficient for insuring an excellent corrosion resistance to aggressive atmospheres prevailing in glass-making or metallurgical furnaces, that is to say for insuring a life in service of about five to eight years. Thicknesses smaller than about 90 mm would be insufficient for a proper corrosion resistance and thicknesses greater than 130 mm would be superfluous and uneconomic. Said lower portion will be usually in the form of a rectangular flat slab, but could be also slightly curved in a manner corresponding to the arc of curvature of the vault, if desired. The archstone also has at least one rib integral with the lower portion and having a height of about 130 to about 270 mm depending on the span of the vault. This rib is necessary for increasing the mechanical strength of the archstone and also, for reasons of stability of the vault, for increasing the area of contact or abutment between adjacent archstones of a given arch. Thus the total thickness (lower portion plus rib) of an archstone may vary from about 220 to 400 mm. The other dimensions (length and width) of the archstone obviously may vary widely, but usually the total thickness will be the smallest dimension of the archstone.

As stated, each archstone should comprise at least one rib, but there may be more than one rib, for instance two or three. When there is only one rib, the rib usually will be centrally positioned in the case of a normal archstone or slightly laterally offset in the case of an end archstone, i.e. of an archstone incorporated in the end arches of the vault. When there are two or three ribs, they usually will be equally spaced from the middle line of the archstone. When there are several ribs, the ribs may be similar or different in size and form. They will be usually similar in the case of a normal archstone and dissimilar in the case of end archstones. According to a highly prefered embodiment the ribs are spaced from the lateral edges of the normal archstones, i.e. the edges of the arch formed by said archstones, so that in the final vault, a recessed portion exists above the joint between two adjacent arches. This facilitates sealing the joint as will be described below.

As previously indicated, in the final vault, the corresponding ribs of the archstones of an arch are aligned in a row and adjacent rows in the vault define a recessed portion which is filled with a refractory concrete, i.e. a concrete resistant to the prevailing temperature, the concrete having preferably good thermally insulating properties. The concrete may be of any known composition. For example, there are commercially available aluminous cements having a high alumina content (up to about 70%), which, when formulated with granular white corundum, makes it possible to prepare concretes withstanding temperatures up to 1800°C and even up to 2000°C if tabular alumina is used in the aggregate. Such concretes can be used as well as those based on alumina and phosphoric acid. In this latter case, as setting occurs above 250°C, a preliminary heating of the vault will have to be performed to achieve setting. For providing good thermally insulating properties to the concrete, small hollow balls of alumina or of other suitable refractory material usually will be included in its formulation, for instance in a amount of 40 to 85% by weight with respect to the total weight of the concrete.

The part of the vault comprised of the ribbed archstones and of the filling concrete performs from the standpoints of corrosion resistance and mechanical strength as well as a similar part formed of massive unribbed archstones having a thickness equal to the total thickness of the defined lower portion and of the rib portion of the present archstones while being lighter and more economical since cheap concrete is substituted for relatively expansive fused cast refractory material.

The percentage of lightening of the ribbed archstones of the invention (before filling with concrete) with respect to massive archstones of the same overall dimensions may vary in the range of about 35 to 55% by weight. A percentage of lightening of about 35% is considered as a minimum for economic reasons and the percentage of lightening of about 55% is considered as a maximum for the retention of a suitable mechanical strength.

The thermally insulating structure covering the concrete filled archstones may be of any desired construction, the only requirement it should meet being that it is so highly efficient that the temperature at the top face thereof does not exceed about 120°C, with preferably not exceeding about 100°C. An example of a suitable insulating structure will be described below.

BRIEF DESCRIPTION OF THE DRAWINGS

The invention will now be described by way of example with reference to the accompanying drawings in which FIG. 1 shows in cross-section a vault comprising a plurality of ribbed archstones according to the invention, the thermal insulation being shown diagrammatically for sake of clarity;

FIG. 2 is a sectional view, at a reduced scale, along line II—II of FIG. 1 and shows the plurality of arches composing the vault; and FIG. 3 shows in perspective another type of archstones which may be used in the vault of the invention.

DESCRIPTION OF THE PREFERRED EMBODIMENTS

The vault shown in FIGS. 1 and 2 comprises a plurality of archstones assembled in arches arranged side-by-side. The archstones composing a given arch are similar, but the various arches are composed of various archstones as shown in FIG. 2. It is frequently necessary to use several types of archstones, for example one-rib archstones and two-rib archstones as shown, in order to accommodate the length of the vault to be constructed. Of course, it is also possible to use only one type of archstones if the length of the vault allows it.

In FIG. 2, two main types of archstones are shown, one type with a single rib and a second type with two ribs. The archstones $a$ of the first type comprise a lower portion 1 in the general form of a slab having wedge-forming end faces 2 and a rib 3 located above the middle of said lower portion and integral therewith, the angles 4 at the connecting areas of the rib and of the lower portion being rounded, as shown, for strength purposes. The rib 3 extends along the length of the arch wherein the archstone is incorporated and from one end face of the lower portion to the other. The end faces 5 of the rib also are wedge-shaped and extend the wedge-shaped end faces of the lower portion so as to increase the contact area between the adjacent archstones of a given arch.

The archstones $b$ of the second type also comprise a lower portion 11 in the form of a slab having wedge-forming end faces 12 and two spaced ribs 13 located above the lower portion and symetrically positioned with respect to the middle of the lower portion, spaced from the lateral faces 16 of the lower portion, and integral with the lower portion. The angles 14 at the connecting areas of the ribs and of the lower portion are also rounded. The ribs 13 extends along the length of the arch wherein the archstone is incorporated and from one end face of the lower portion to the other. Again the end faces 15 of the ribs are wedge-shaped and extend the wedge-shaped end faces of the lower portion so as to increase the contact area between the adjacent archstones of a given arch.

FIG. 2 also shows an end archstones $b'$ which has two ribs 13 and 13'. There archstones are used in the end arches of the vault, as shown. They differ from the other archstones $b$ in that the extreme rib 13' is wider than the rib 13 and extends at its bottom side to the extreme lateral face 16' of the archstone, its top part being somewhat narrower than its bottom part, as shown.

As shown in FIG. 1, the extreme archstones of a given arch bear in a known manner against skew blocks 20 which in turn rest on the sidewalls of the furnace, appropriate devices being provided for allowing thermal expansion and contractions as is well-known.

The archstones $a$, $b$ and $b'$ as well as the skew blocks are dense molded parts made by casting one or a mixture of refractory oxides previously fused, usually in an electric furnace.

As specific examples of refractory materials for making the archstones, we may cite the commercially available fused cast refractory products E.R. 1681 ($Al'2O_3$ 50.6%, $ZrO_2$ 32.5%, $SiO_2$ 15.7%, $Na_2O$ 1.1% by weight) and E.R. 1682 (same composition as E.R. 1681, but more porous, density of about 3.3 g/cm$^3$ instead of 3.5–3.6 g/cm$^3$) sold by SOCIETE EURO- PEENNE DES PRODUITS REFRACTAIRES (S.E.P.R. in abridged form), 84130 LE PONTET, France, for vaults for glass furnaces. Also, for vaults for glass and metallurgical furnaces, the following compositions may be used:

| 1 | | 2 | |
|---|---|---|---|
| $SiO_2$ | 20% by weight | $Al_2O_3$ | 96% by weight |
| $Al_2O_3$ | 70% by weight | $Na_2O$ | 4% by weight |
| $ZrO_2$ | 5% by weight | | |
| $Fe_2O_3$, $TiO_2$, CaO and $Na_2O$ for the remainder. | | | |
| as well as substantially pure $Al_2O_3$. | | | |

The thickness of the lower portion and the height of the ribs of the archstones $a$, $b$ and $b'$ should be between about 90 and 130 mm and between about 130 and 270 mm, respectively, as previously indicated. As to the width of the ribs 3 and 13, it may be of the order of about 70 to 100 mm at their top face, while the width of the rib 13' may be greater, for instance from 150 to 200 mm at its top face. Usually the width of the ribs will be somewhat greater at their bottom portion than at their top portion for strength purposes. As disclosed above, the size of the ribs should be such that the percentage of lightening with respect to a massive archstone of the same overall dimensions should be between about 35 to 55%, at least for the normal archstones such as $a$ and $b$. It may be somewhat smaller for end archstones such as $b'$.

Once assembled in adjacent arches in the vaults, the ribs of the archstones form continuous rows of ribs between which are recessed portions 21. There recessed portions are then filled with any appropriate refractory concrete 22, for instance such as disclosed above. A specific example of an appropriate concrete is the product sold under the commercial designation "E.R. 554" by S.E.P.R. and having a density of about 1.3 g/cm³. This is an aluminous concrete containing small hollow balls of alumina. The vault is finally covered with a very efficient thermally insulating structure of any desired construction. An example of such a structure is shown in FIGS. 1 and 2. This structure comprises, from the bottom to the top, a first layer 23 having a thickness of about 50 mm and composed of insulating boards made of "E.R. 554" (density of about 1.3 g/cm³), a second layer 24 having a thickness of about 110 mm and composed of insulating bricks made of "L.I. 26" (sold by S.E.P.R.; density of 0.75 g/cm³), a third layer 25 having a thickness of about 100 mm and composed of insulating bricks made of "L.I. 20" (sold by S.E.P.R.; density 0.45 g/cm³), and a fourth layer 26 composed of an 1 mm thick aluminium sheet acting as a anti-radiating screen. With a temperature of 1520°C at the inside surface of the vault, the temperature at the top surface of the aluminium sheet is about 95°C, when using archstones made of E.R. 1682 (density 3.3 g/cm³) having a 100 mm thick lower portion and 150 mm high ribs.

FIG. 3 shows a further type of archstones usable for constructing vaults according this invention and which is particularly useful when it is desired to use archstones having a large width (dimension transverse to the longitudinal direction of an arch). As shown, in this embodiment, the archstone $c$ comprises two ribs 33 arranged above the lower portion 31 and close to the lateral faces 36 thereof. Because, in such a case, the ribs are spaced from a relatively large distance, an additional rib 37 is provided transversely to the ribs 33 and in a central position with respect to the lower portion. Rib 37 is sligthly lower than the ribs 33 and acts as an additional reinforcement for the archstone, which might otherwise be too weak in its central portion due to the large space between the ribs 33.

In conclusion, it is possible when using the new concept of making furnace vaults according to the invention to achieve vaults which are very reliable and highly thermally insulating, which markedly improves the economy of the furnaces by reducing the loss of heat (saving of energy) and by spacing the stoppages of the furnace for repairing or changing the vaults. It is also possible, due to the high refractory of the archstones used, to improve the productivity of both existing and new glass furnaces by increasing the melting temperature above 1600°C.

We claim:

1. A self-supporting vault capable of being utilized at temperatures above 1500°C, the vault comprising: (i) a plurality of arches arranged side-by-side, each arch being made of a plurality of archstones composed of a fused cast refractory material, each archstone comprising a lower portion of a thickness ranging from about 90 to about 130 mm, and at least one upper rib portion integral with said lower portion and having a height ranging from about 130 to about 270 mm, said upper rib portion extending along the longitudinal direction of the plurality of archstones of each respective arch wherein it is incorporated and the corresponding upper rib portions of the archstones of a given arch being arranged in an aligned and abutting relationship; (ii) a refractory concrete substantially filling the entire recessed portions existing between the aligned upper rib portions; and (iii) a thermally insulating structure covering the filled ribbed archstones, said structure being such that the temperature at the top face thereof does not exceed about 120°C.

2. A vault according to claim 1, wherein the thickness of said lower portion ranges from about 100 to about 120 mm.

3. A vault according to claim 1, wherein said thermally insulating structure is such that the temperature at the top face thereof does not exceed about 100°C.

4. A vault according to claim 1, wherein at least one of said archstones has one rib located in the middle of said lower portion.

5. A vault according to claim 1, wherein at least one of said archstones has two similar ribs symetrically disposed with respect to the middle of said lower portion and spaced from the lateral sides of said lower portion.

6. A vault according to claim 1, wherein each of said archstones arranged at the ends of said arch have two ribs, each rib being disposed on one side of the middle of said lower portion, said rib at the end of said arch being wider than the other said rib and extending at its bottom side to the extreme lateral face of said archstone.

7. A vault according to claim 1, wherein at least one of said archstones has two ribs symetrically disposed with respect to the middle of said lower portion and adjacent to the lateral sides of said lower portion, and a third rib disposed transverse to the other said ribs and centrally located with respect to said lower portion.

8. A vault according to claim 1, wherein said refractory concrete exhibits good thermally insulating properties.

9. A vault according to claim 8, wherein said refractory concrete contains small hollow balls of a refractory material.

* * * * *